United States Patent [19]
Hohenberg

[11] 3,719,071
[45] March 6, 1973

[54] MEASUREMENT OF GAS TEMPERATURE VARIATIONS IN A GAS TURBINE ENGINE

[75] Inventor: Rudolph Hohenberg, Trumbull, Conn.

[73] Assignee: Avco Corporation, Stratford, Conn.

[22] Filed: Aug. 30, 1971

[21] Appl. No.: 176,286

Related U.S. Application Data

[63] Continuation of Ser. No. 809,615, March 21, 1969, abandoned.

[52] U.S. Cl. ..................73/341, 73/116, 73/346, 73/349
[51] Int. Cl. ....G01k 7/04, G01k 13/02, G01m 15/00
[58] Field of Search.....73/116, 117.3, 341, 349, 346; 235/151.3

[56] References Cited

UNITED STATES PATENTS

| | | |
|---|---|---|
| 2,456,499 | 12/1948 | Fritzinger..................73/342 X |
| 3,472,068 | 10/1969 | List et al....................73/346 X |
| 3,138,957 | 6/1964 | Brunson.......................73/341 |
| 3,101,617 | 8/1963 | Brinson........................73/341 |
| 2,815,500 | 12/1957 | Hance et al..............73/341 UX |
| 3,112,880 | 12/1963 | Pollock.....................73/341 X |

*Primary Examiner*—S. Clement Swisher
*Assistant Examiner*—Frederick Shoon
*Attorney*—Charles M. Hegan et al.

[57] ABSTRACT

A plurality of thermocouples is positioned in the exhaust gas stream of a gas turbine engine. The voltage generated by each thermocouple is sensed and the average temperature and the highest and lowest temperatures are derived. In addition, the differences between the average temperature and the highest and lowest temperatures, respectively, are used to provide an indication of the temperature spread sensed by the thermocouples.

6 Claims, 3 Drawing Figures

MEASUREMENT OF GAS TEMPERATURE VARIATIONS IN A GAS TURBINE ENGINE

This application is a streamline continuation of application Ser. No. 809,615, filed Mar. 21, 1969, and now abandoned.

BACKGROUND OF THE INVENTION

Mechanical power is extracted from hot pressurized gas by expanding the gas through turbines. It is present practice to measure average exhaust gas temperature for determination of operating conditions. Since gas temperature, over any plane perpendicular to the flow in the gas path, is not the same, it is present practice to average the temperature readings from a multiplicity of temperature sensing elements.

A comparison of the measured temperature extremes with the average temperature can give a meaningful indication of the condition of a gas turbine combustor system. The average temperature is conditioned by the fuel control to produce the desired power, but the temperature variation existing in any given plane is determined by the design and construction of the combustion system components and also by the functional condition of these components. The fuel control will demand the necessary average gas temperature, and a turbine engine will appear to be operating satisfactorily while serious deterioration may be occurring. However, since deterioration in the combustion system causes an increase in the high and low temperature extremes, these extremes can cause premature failure of the components in the gas path.

Temperature distribution in the inlet gas stream of high performance gas turbine engines often lacks uniformity, and as a result a relatively large number of thermocouples is used to develop an accurate average gas stream temperature. With a large number of thermocouples, meaningful information in addition to average gas temperature may also be derived; for example, the temperature extremes occurring in the gas stream are related, not only to combustor design, but also to the condition of the components.

Standards have been determined empirically for the temperature extremes which may be encountered in any particular combustor system. A temperature extreme greater than the standard is an indication of deterioration or damage to some component of the system. For example, where a fuel nozzle is plugged, the fuel control will still demand the necessary average gas temperature, but increased fuel flow through other nozzles produces an attendant increase in other local temperatures.

In accordance with the present invention, the voltages proportional to the temperature generated by the individual thermocouple elements are sensed and the following readouts are provided:

1. $T_{Avg.}$ = Average temperature of all thermocouples
2. $T_{High}$ = The highest thermocouple temperature sensed
3. $T_{Low}$ = The lowest thermocouple temperature sensed
4. $R_{High(Spread)} = T_{High}$ minus $T_{Avg}$.
5. $T_{Low(Spread)} = T_{Avg}$. minus $T_{Low}$

THE DRAWINGS

FIG. 1 represents one embodiment of this invention;
FIG. 2 is a series of curves illustrating the operation of FIG. 1; and
FIG. 3 is another embodiment of this invention.

DESCRIPTION OF THE EMBODIMENT OF FIG. 1

Figure 1:
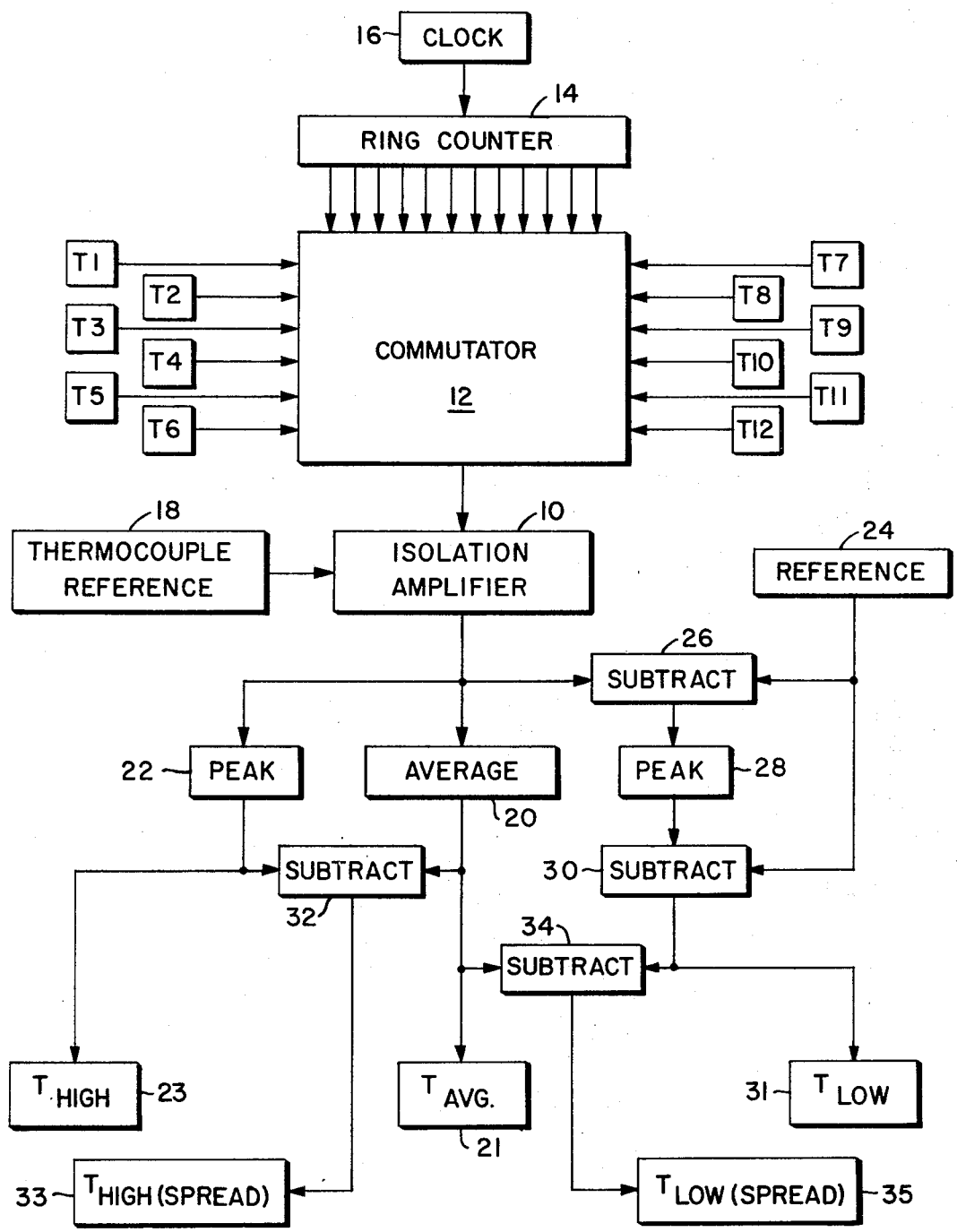

The embodiment of the invention illustrated in FIG. 1 utilizes 12 thermocouples T1–T12, each generating a voltage proportional to the temperature of the gas at a particular point in the exhaust stream of a gas turbine engine. The voltages developed by the thermocouples T1–T12 are sequentially delivered to an isolation amplifier 10 by means of a scanner comprising a commutator 12, a ring counter 14, and a clock 16. As is conventional, the commutator 12 includes 12 electronic switches, one for each of the thermocouples, and each of the electronic switches is sequentially closed by the operation of the ring counter 14, which in turn is timed by the clock 16. Clock 16 may comprise a conventional free-running multivibrator. In actual practice the twelve thermocouples are scanned at the rate of 15 times per second.

The isolation amplifier 10 is a high performance differential amplifier. In addition to its having an input from the commutator 12, it has a differential input from a thermocouple reference voltage circuit 18 which provides compensation in a conventional manner for the thermocouples T1–T12.

The output from the isolation amplifier 10, the difference between thermocouple reference voltage and the wave form generated by the commutator 12, is applied to an averager circuit 20, the output of which provides the temperature representing $T_{Avg}$ and is delivered to a suitable readout device 21. The averager circuit is conventional and need not be described here. Essentially it is a modified lag circuit with an operational amplifier as the active element which provides a precise average of the input signals during one complete scan of the commutator.

To develop the high peak temperature signal $T_{High}$, the output from the isolation amplifier 10 is applied to a high peak seeking circuit 22. This circuit is also conventional and simply responds to and holds the highest voltage applied to it during a single scan. The output of the peak circuit 22 represents high peak temperature $T_{High}$, which is then applied to a suitable readout 23.

To obtain the lowest temperature $T_{Low}$, a reference voltage circuit 24 provides a fixed reference voltage higher than any voltage generated from the isolation amplifier 10. The output from the isolation amplifier 10 is then subtracted from the reference voltage output in a subtractor circuit 26. The output from the subtractor circuit 26 is then applied to a high peak seeking circuit 28 where the high peak of the output of the subtractor circuit 26 is developed. To obtain the lowest thermocouple temperature $T_{Low}$, the output from the high peak seeking circuit 28 is subtracted from the reference voltage circuit 24 in a subtractor circuit 30. The $T_{Low}$ signal is then applied to a suitable readout device 31.

The high temperature spread signal $T_{High(Spread)}$ is derived simply by subtracting the average temperature output $T_{Avg}$ from the highest thermocouple temperature $T_{High}$ in a subtractor 32. The $T_{High}$ signal is then applied to a readout 33. The low temperature spread signal $T_{Low(Spread)}$ is derived by subtracting the $T_{Low}$ from $T_{Avg}$ in a subtractor 34, and then is applied to a readout 35.

Figure 2:
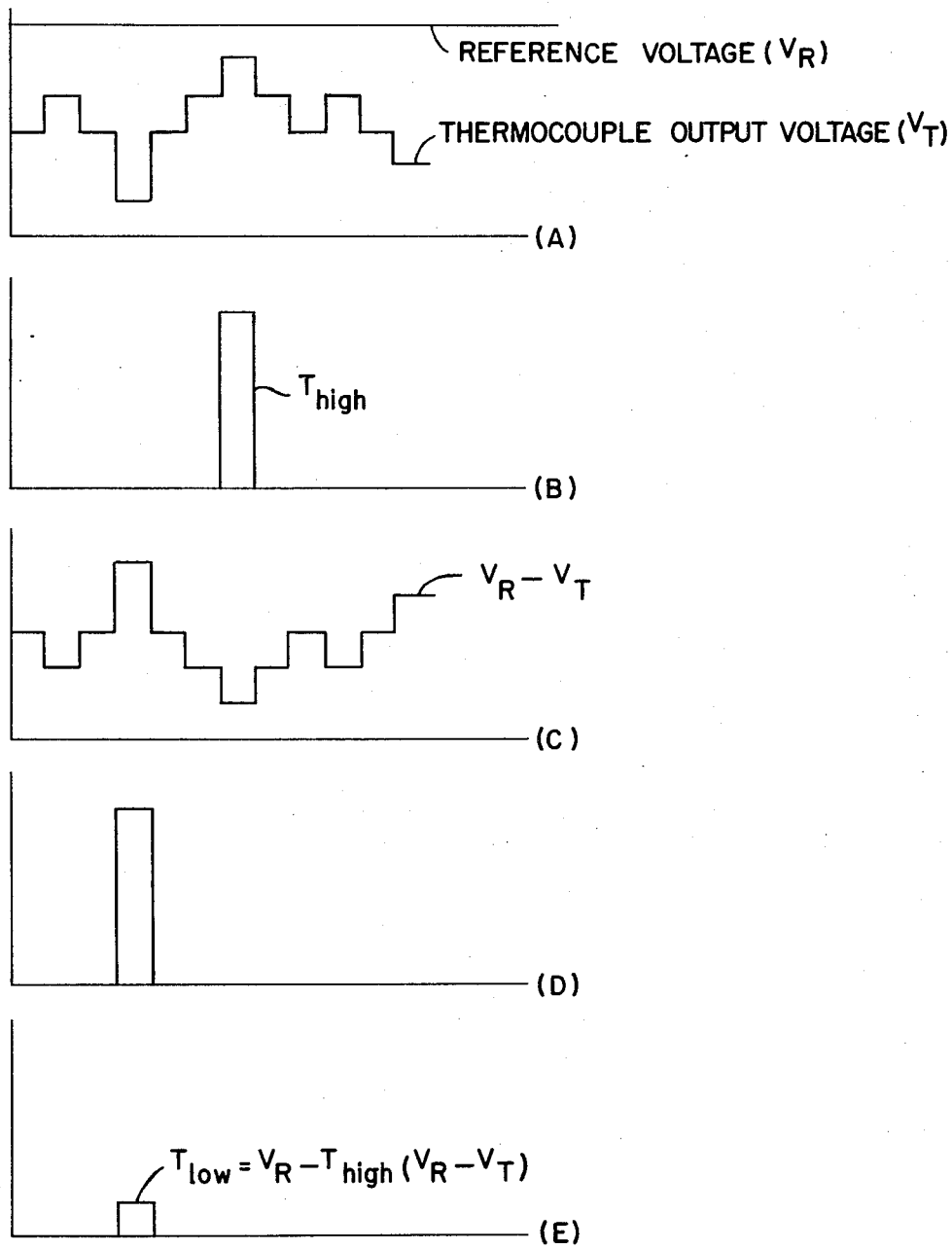

The operation of the embodiment of FIG. 1 may be better understood by reference to the curves of FIG. 2. Curve A includes the scanned thermocouple output voltage $V_T$ as read at the output of the isolation amplifier 10. In addition, the output $V_R$ of the reference voltage circuit 24 is shown as higher than any of the thermocouple voltages $V_T$. Curve B shows $T_{High}$ as representing the highest thermocouple voltage scanned during the generation of curve A. Curve C represents the subtraction of the thermocouple output voltage $V_T$ from the reference voltage $V_R$. It will be noted that this subtraction produces the highest voltage at the time of generation of the lowest temperature. Therefore, by applying the output of the subtractor 26, curve C, to the peak seeking circuit 28, curve D is yielded. $T_{Low}$, curve E, is developed by subtracting curve D from the reference voltage.

DESCRIPTION OF THE EMBODIMENT OF FIG. 3

Figure 3:
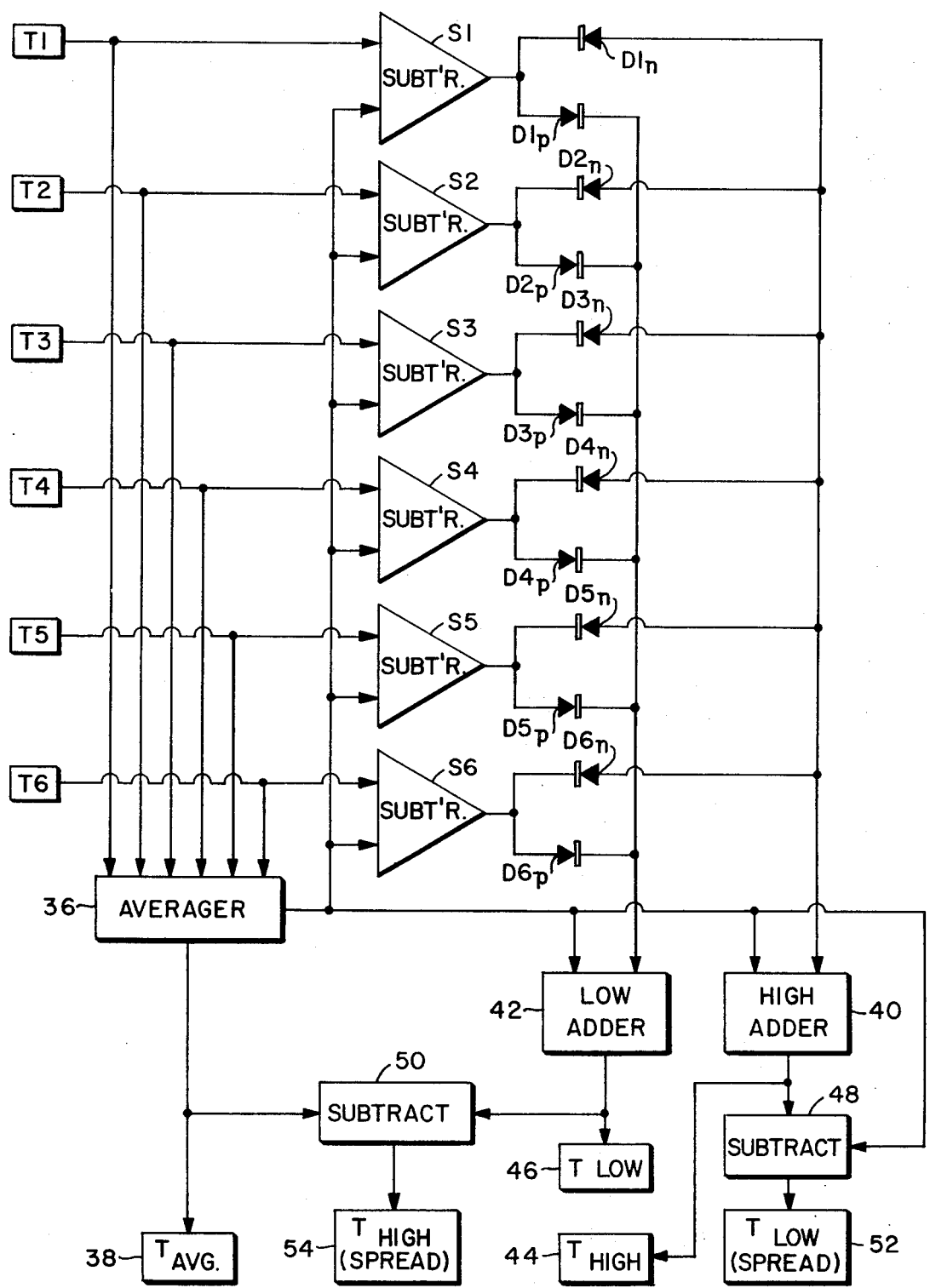

The FIG. 3 embodiment of this invention utilizes a plurality of thermocouples T1–T6. While six thermocouples are shown for convenience of illustration, any other number may be practicable depending on the requirements of the system. The D.C. output from each of the thermocouples T1–T6 is applied to an averager circuit 36 which delivers a voltage proportional to the average of the temperatures measured by the thermocouples. This signal is applied to a conventional readout device 38.

The output from each of the thermocouples T1–T6 is also applied to a one input of a respective subtractor S1–S6, the other input terminal of which is supplied with the output from the averager 36. The output from each subtractor S1–S6 represents the difference, positive or negative, between the average temperature and the temperature at a respective thermocouple T1–T6. This difference is coupled to a first adder 40 through negatively poled diodes $D1_n$–$D6_n$, respectively, and to a second adder 42 through oppositely poled diodes $D1_p$–$D6_p$, respectively.

The most negative voltage output from the subtractors S1–S6 will pass through its respective negatively poled diode, but will back-bias all of the others. For example, if the highest measured temperature occurs at thermocouple T1, the most negative voltage will appear at the output of the subtractor S1. Because of the negative polarity, $D1_p$ will be cut off but $D1_n$ will conduct, thereby back-biasing all of the other negatively poled diodes $D2_n$–$D6_n$.

The most positive going voltage output from the subtractors S1–S6 will pass through its respective positively poled diode but will back-bias all of the others. For example, if the lowest measured temperature occurs at thermocouple T2, the most positive voltage will appear at the output of subtractor S2. The positive voltage at the output of S2 will back-bias the negatively poled diode $D2_n$ but will pass through the positively poled diode $D2_p$. Conduction through diode $D2_p$ will serve to back-bias all the remaining positively poled diodes. When the outputs from the subtractors containing the low and high extremes are applied to the adders 40 and 42, their original values are restored. The output from the adder 40 when applied to a conventional readout 44 shows the highest thermocouple temperature deviation from the average, while the output of the adder 42 when applied to a conventional readout 46 shows the lowest thermocouple temperature deviation.

As pointed out previously, an extreme variation between the highest temperature and the average temperature can indicate a serious operating problem, such as a clogged nozzle or a hot spot and this could lead to early deterioration. These extreme deviations from the average can be monitored by subtracting in a subtractor 48 the output from the adder 40 from the output of the averager 36, and by subtracting the output of the averager 36 from the output of the adder 42 in a subtractor 50. The lowest and the highest temperature deviations are monitored in readouts 52 and 54 supplied from the subtractors 48 and 50, respectively.

While two embodiments of this invention have been described, it will be apparent that many other variations and adaptations are available to persons skilled in the art. Thus, while the invention has been described in connection with a temperature measuring system, it may be adapted for use as a pressure measuring system. For example, in a system where a plurality of pressure sensing devices are used, the system could develop outputs representing the average, high and low pressures as well as the high and low pressure spreads. It is intended therefore that this invention be limited only by the following claims as interpreted in the light of the prior art.

I claim:

1. A system for monitoring the temperature of gases flowing through a passage of a gas turbine engine comprising:

a plurality of temperature sensing devices distributed in said passage, said devices being thermocouples and having a variable parameter, said variable parameter being a thermocouple output voltage, the magnitude of which is proportional to temperature;

means for establishing a first signal proportional to the average of the magnitudes of said parameters, said means for establishing said first signal comprising an electronic circuit for averaging the thermocouple output voltages sequentially applied thereto, and a switching system between said thermocouples and said electronic circuit, said switching system sequentially switching the thermocouple output voltage from each of said thermocouples to said electronic circuit;

means for establishing a second signal proportional to the magnitude of the parameter of highest magnitude;

means for establishing a third signal proportional to the magnitude of the parameter of lowest magnitude;

first subtraction means for subtracting said first signal from said second signal for deriving a fourth signal proportional to the difference between the highest temperature sensed by said devices and the average temperature sensed by said devices; and second subtraction means for subtracting said third signal from said first signal for deriving a fifth signal proportional to the difference between the lowest temperature sensed by said devices and the average temperature sensed by said devices.

2. The invention as defined in claim 1 wherein said means for establishing said second signal comprises a first peak seeking circuit for developing and holding the highest voltage applied thereto during a cycle of said switching system, said thermocouple voltage outputs being applied thereto through said switching system.

3. The invention as defined in claim 2 wherein said means for establishing said third signal comprises:

a subtractor circuit for developing an output equal to the difference between the voltages supplied thereto, said subtracting circuit being supplied with said thermocouple voltage outputs through said switching system and with a fixed reference voltage having a magnitude greater than the highest possible thermocouple voltage;

a second peak seeking circuit for developing and holding the highest voltage applied thereto during a cycle of said switching system, the output from said subtractor circuit being applied to said second peak seeking circuit; and a second subtractor circuit for subtracting the output of said second peak seeking circuit from said reference voltage.

4. A system for monitoring the temperature of gases flowing through a passage of a gas turbine engine comprising:

a plurality of temperature sensing devices distributed in said passage, said devices having a variable parameter, the magnitude of which is proportional to temperature;

means for establishing a first signal proportional to the average of the magnitudes of said parameters, said means for establishing said first signal comprising an electronic averaging circuit for averaging a plurality of voltages supplied thereto, said electronic circuit being supplied with the thermocouple output voltage from each of said plurality of thermocouples;

means for establishing a second signal proportional to the magnitude of the parameter of highest magnitude;

means for establishing a third signal proportional to the magnitude of the parameter of lowest magnitude;

first subtraction means for subtracting said first signal from said second signal for deriving a fourth signal proportional to the difference between the highest temperature sensed by said devices and the average temperature sensed by said devices;

second subtraction means for subtracting said third signal from said first signal for deriving a fifth signal proportional to the difference between the lowest temperature sensed by said devices and the average temperature sensed by said devices; and wherein said means for establishing said second and third signals comprises a subtractor circuit for each thermocouple, said subtractor circuits developing an output proportional to the difference between the voltages supplied thereto, said first signal being supplied to each of said subtractor circuits, the thermocouple voltage output of each thermocouple being supplied to a respective one of said circuits;

a pair of oppositely poled diodes for each of said circuits;

first and second adders for developing a voltage output proportional to the summation of the input voltages supplied thereto, the output of each of said subtractor circuits being applied to one of said adders through a respective diode of one polarity, the output of each of said subtractor circuits being applied to the other adder through a respective diode of opposite polarity, and the output of said averaging circuit being applied to said first and second adders, the output of said adders representing said second and third signals, respectively.

5. In a system for monitoring the temperature of gases flowing through a passage of a gas turbine engine, said system including a plurality of temperature sensing devices distributed in said passage, said devices having a variable parameter, the magnitude of which is proportional to temperature, a display system for continuously displaying the difference between the highest temperature and the average temperature and the difference between the lowest temperature and the average temperature of the gases flowing through said passage, the combination comprising:

means for establishing a first continuous signal proportional to the average of the magnitudes of said parameters;

means for continuously selecting the variable parameter of highest magnitude;

means for establishing a second continuous signal proportional to the magnitude of the parameter of highest magnitude;

means for continuously selecting the variable parameter of lowest magnitude;

means for establishing a third continuous signal proportional to the magnitude of the parameter of lowest magnitude;

first subtraction means for subtracting said first signal from said second signal for deriving a fourth continuous signal proportional to the difference between the highest temperature sensed by said devices and the average temperature sensed by said devices; and second subtraction means for subtracting said third signal from said first signal for deriving a fifth continuous signal proportional to the difference between the lowest temperature sensed by said devices and the average temperature sensed by said devices.

6. The invention as defined in claim 5, and first and second display devices for continuously displaying said fourth and fifth signals, respectively, whereby the differences from the average of the highest and lowest temperatures are continuously monitored.

* * * * *